(12) United States Patent
Fleck et al.

(10) Patent No.: US 9,438,554 B2
(45) Date of Patent: Sep. 6, 2016

(54) CROSS PLATFORM MESSAGING

(71) Applicant: Citrix Systems, Inc., Fort Lauderdale, FL (US)

(72) Inventors: Christopher Fleck, Boca Raton, FL (US); John McBride, Coral Springs, FL (US); Mark Templeton, Gulf Stream, FL (US); Nathan Anderson, San Jose, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 344 days.

(21) Appl. No.: 13/788,247

(22) Filed: Mar. 7, 2013

(65) Prior Publication Data

US 2013/0238728 A1    Sep. 12, 2013

Related U.S. Application Data

(60) Provisional application No. 61/608,275, filed on Mar. 8, 2012.

(51) Int. Cl.
*H04L 12/58* (2006.01)
*G06Q 10/10* (2012.01)

(52) U.S. Cl.
CPC .............. *H04L 51/36* (2013.01); *G06Q 10/10* (2013.01); *G06Q 10/107* (2013.01)

(58) Field of Classification Search
CPC ............. G06Q 40/04; G06Q 30/0201; G06Q 30/0206; G06Q 40/06; G06Q 50/01; G06Q 10/0635; G06Q 10/101; G06Q 10/109; G06Q 20/04; G06Q 20/0855; G06Q 20/10; G06Q 20/102; G06Q 10/10; G06Q 30/02; G06Q 30/00; G06Q 10/107; H04L 12/5895; H04L 51/38; H04L 51/066; H04L 51/36; H04L 12/1895; H04L 12/5835; H04L 12/5855; H04L 45/22; H04L 45/28; H04L 51/04; H04L 51/14; H04L 12/189; H04L 12/581; H04L 12/5865; H04L 2209/805; H04L 41/0654; H04L 41/0668; H04L 51/10; H04L 51/16; H04L 51/32; H04L 63/101; H04L 63/104; H04L 63/20; H04L 65/1016; H04L 65/1026; H04L 65/1053; H04L 12/58; H04L 43/0817; H04L 12/1859; H04L 67/26; H04L 51/046; H04L 51/12; H04L 51/22; H04W 4/14; G06F 17/30126; G06F 2203/04803; G06F 3/0482
See application file for complete search history.

(56) References Cited

U.S. PATENT DOCUMENTS 7,353,254 B2 *   4/2008   Kusuda ................... H04L 12/66
                                                          709/204
7,680,895 B2 *   3/2010   Perlow .................... H04L 51/36
                                                          709/206

(Continued)

OTHER PUBLICATIONS

International Application No. PCT/US2013/029601—International Search Report dated Aug. 23, 2013.

*Primary Examiner* — Kevin Bates
*Assistant Examiner* — Ranjan Pant
(74) *Attorney, Agent, or Firm* — Banner & Witcoff, Ltd.

(57) ABSTRACT

Described herein are methods and systems for displaying an email conversation similar to an instant message format by integrating aspects of an email system with an instant messaging interface. In one aspect, messages may be sent over existing email channels using email protocols through email servers and an email system (e.g., email client and/or email server) may identify the messages as cross-platform messages (CPM) based on whether the message body includes either no or only predefined content, or the message includes a predefined unique identifier. If a message is identified as a CPM then the message is treated similar to an instant message and may be displayed in a threaded view. In some embodiments, messages having content in the body may be treated as conventional email messages.

20 Claims, 9 Drawing Sheets

(56) References Cited

U.S. PATENT DOCUMENTS

| | | | | |
|---|---|---|---|---|
| 8,020,105 B1* | 9/2011 | Lemay | H04L 51/36 709/227 |
| 8,041,770 B1* | 10/2011 | Schmidt | G10L 19/0208 709/206 |
| 2004/0064514 A1* | 4/2004 | Daniell | G06Q 10/107 709/206 |
| 2004/0215721 A1* | 10/2004 | Szeto | H04L 12/58 709/204 |
| 2007/0283039 A1* | 12/2007 | Kim | H04L 12/5835 709/238 |
| 2007/0287485 A1* | 12/2007 | Klassen | G06Q 10/107 455/466 |
| 2008/0098078 A1* | 4/2008 | Daniell | G06Q 10/107 709/206 |
| 2008/0168149 A1* | 7/2008 | Daniell | H04L 12/581 709/206 |
| 2008/0168173 A1 | 7/2008 | Munje et al. | |
| 2009/0083761 A1 | 3/2009 | Mully | |
| 2009/0319918 A1* | 12/2009 | Affronti | G06F 3/038 715/753 |
| 2010/0036926 A1* | 2/2010 | Ahart | G06Q 10/10 709/206 |
| 2010/0313156 A1* | 12/2010 | Louch | G06F 3/0481 715/769 |
| 2011/0171936 A1* | 7/2011 | Khoury | H04L 12/587 455/412.2 |
| 2013/0097526 A1* | 4/2013 | Stovicek | G06Q 10/107 715/752 |

* cited by examiner

To: Dave Jones
From: Ross
Subject: Who are they playing?
Body: <null>
MessageID: 456
Thread-Index: ABC

FIG. 4 401

To: Ross
From: Dave Jones
Subject: The Yankees
Body: <null>
MessageID: 789
Thread-Index: ABC

FIG. 5 501

To: Dave Jones
From: Ross
Subject: Only if the seats are decent.
I LOVE watching the Yankees lose!
Body: <null>
MessageID: 890
Thread-Index: ABC

| ☺ Dave Jones | ME: Who are they playing? | Tue 11/8/2011 2:40... 2KB |

| ☺ Dave Jones | The Yankees | Tue 11/8/2011 2:45... 2KB |

| ☺ Dave Jones | ME: Only if the seats are decent. I LOVE watching watching the Yankees lose! | Tue 11/8/2011 2:52... 2KB |

CROSS PLATFORM MESSAGING

CROSS-REFERENCE TO RELATED APPLICATIONS

The present application is a non-provisional of and claims priority to U.S. provisional application Ser. No. 61/608,275, filed Mar. 8, 2012, entitled "CROSS PLATFORM MESSAGING," herein incorporated by reference in its entirety.

FIELD

The disclosure relates generally to electronic messaging between data processing devices over one or more networks. More specifically, the disclosure provides methods and systems to distinguish messages and/or message threads based on message content or the lack thereof.

BACKGROUND

Using email to carry out brief conversations can be inefficient and frustrating. Employees often mitigate these inefficiencies by writing emails that include conversational content in the title but no content in the body of the message. Although other conversation modalities such as short message service (SMS, MMS, etc.) and texting facilitate quick text based conversations, these modalities often have a high per unit cost and may not be compatible with all platforms and devices (e.g., desktops, laptops, tablets.) In many instances, SMS services and the like may only be supported by select devices and are generally incompatible with multiple platforms, operating systems and applications. Furthermore, many known message solutions are independent systems not integrated with email. For example, Apple iMessage provides an alternative method for combining SMS and IM, but this method can only be used on iOS devices or on a device executing an Apple operating system and is not compatible with non-Apple devices or operating systems. Similarly Research in Motion (RIM) BlackBerry Messenger (BBM) provides instant messaging, but only for RIM devices.

BRIEF SUMMARY

The following presents a simplified summary of the disclosure to provide a basic understanding of aspects of the systems and methods described herein. This summary is not an extensive overview of the disclosure and it is not intended to identify key or critical elements of the disclosure or to delineate the scope of the disclosure. The following summary merely presents some concepts of the disclosure in a simplified form as a prelude to the more detailed description provided below.

To overcome limitations in the prior art described above, and to overcome other limitations that will be apparent upon reading and understanding the present specification, the present disclosure describes methods and systems for integrating instant messaging and email messaging into a unified system that is agnostic as to the device, platform or environment within which it is deployed and/or used. According to aspects of the methods and systems described herein, instant messages may be sent over existing email channels using email protocols through email servers. The email system (e.g., email client and/or email server) may differentiate between traditional email messages and instant messages based on predetermined criteria. This criteria may be whether the message includes no content in the message body, the message contains only predefined content in the message body, or the message contains or is associated with predefined metadata or a digital tag indicating that the message was sent from a special client application, e.g., one that handles cross-platform messages (CPM) as described further herein. When the email system identifies a message as a cross-platform message (CPM) by determining that the body of the message is blank or contains only predefined content (e.g., form text, user signature, etc.), or contains a unique ID or metadata tag generated by the CPM app, then the email system treats the message like an instant message and may display the message in a threaded view. Messages having content in the body other than predefined content may be treated by the email system as conventional email messages and may be excluded from a set of messages displayed in the threaded view.

BRIEF DESCRIPTION OF THE DRAWINGS

A more complete understanding of the present disclosure and the advantages thereof may be acquired by referring to the following description in consideration of the accompanying drawings, in which like reference numbers indicate like features, and wherein:

FIG. 4 illustrates a cross-platform message (CPM) according to one or more illustrative aspects described herein.

FIG. 5 illustrates a cross-platform message (CPM) according to one or more illustrative aspects described herein.

FIG. 6 illustrates a cross-platform message (CPM) according to one or more illustrative aspects described herein.

FIG. 8 illustrates an updated inline CPM thread according to one or more illustrative aspects described herein.

FIG. 9 illustrates an updated inline CPM thread according to one or more illustrative aspects described herein.

FIG. 10 illustrates an updated inline CPM thread according to one or more illustrative aspects described herein.

DETAILED DESCRIPTION

In the following description of the various embodiments, reference is made to the accompanying drawings, which form a part hereof, and in which is shown by way of illustration various embodiments in which the disclosure may be practiced. It is to be understood that other embodiments may be utilized and structural and functional modifications may be made without departing from the scope of the present disclosure. The disclosure is capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Figure 1:
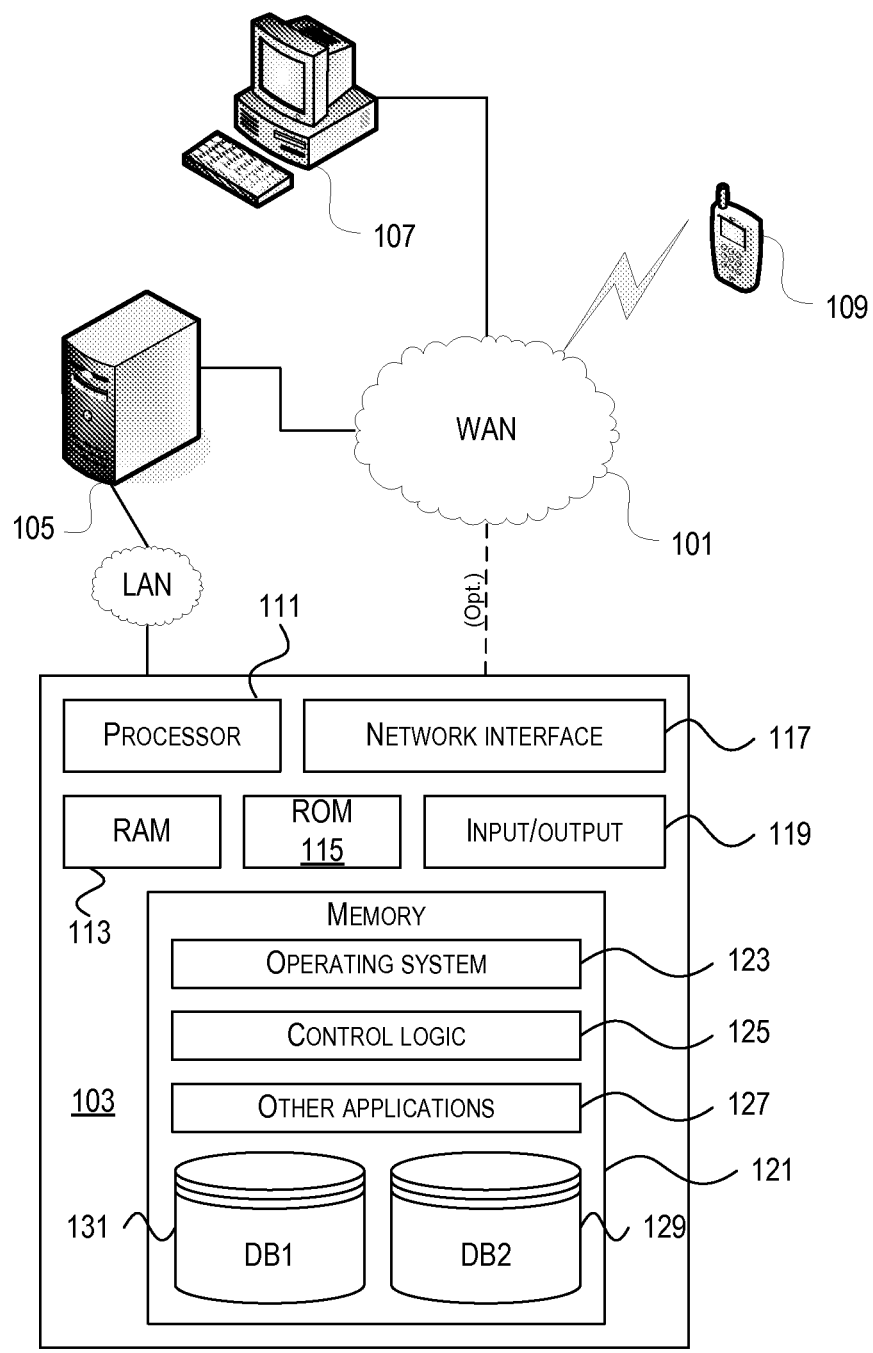
FIG. 1 illustrates a system architecture that may be used according to one or more illustrative aspects described herein.

FIG. 1 illustrates one example of a network architecture and data processing device that may be used to implement one or more illustrative aspects of the disclosure. Various network nodes 103, 105, 107, and 109 may be interconnected via a wide area network (WAN) 101, such as the Internet. Other networks may also or alternatively be used, including private intranets, corporate networks, LANs, wireless networks, personal networks (PAN), and the like. Network 101 is for illustration purposes and may be replaced with fewer or additional computer networks. A local area network (LAN) may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects of the disclosure as described herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the rate server 103. Data server 103 may further include RAM 113, ROM 115, network interface 117, input/output interfaces 119 (e.g., keyboard, mouse, display, printer, etc.), and memory 121. I/O 119 may include a variety of interface units and drives for reading, writing, displaying, and/or printing data or files. Memory 121 may further store operating system software 123 for controlling overall operation of the data processing device 103, control logic 125 for instructing data server 103 to perform one or more aspects of the disclosure as described herein, and other application software 127 providing secondary, support, and/or other functionality which may or may not be used in conjunction with aspects of the present disclosure. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects of the disclosure, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

One or more aspects of the disclosure may be embodied in computer-usable or readable data and/or computer-executable instructions, such as in one or more program modules, executed by one or more computers or other devices as described herein. Generally, program modules (e.g., the control logic) include software, routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein.

Aspects described herein provide an improved instant messaging service usable with and, in some instances, initiated within an existing email and/or personal information management (PIM) infrastructure. Stated differently, aspects described herein provide the ability to use a single messaging system for more effective use of email, short message services (SMS, MMS, etc.), and instant messaging, in a single cross-platform environment. The messages of the improved instant messaging services may be referred herein as "cross-platform messages" ("CPM messages"), which may be processed, in various embodiments described herein, alongside conventional e-mail messages and/or instant messages.

Figure 2A:
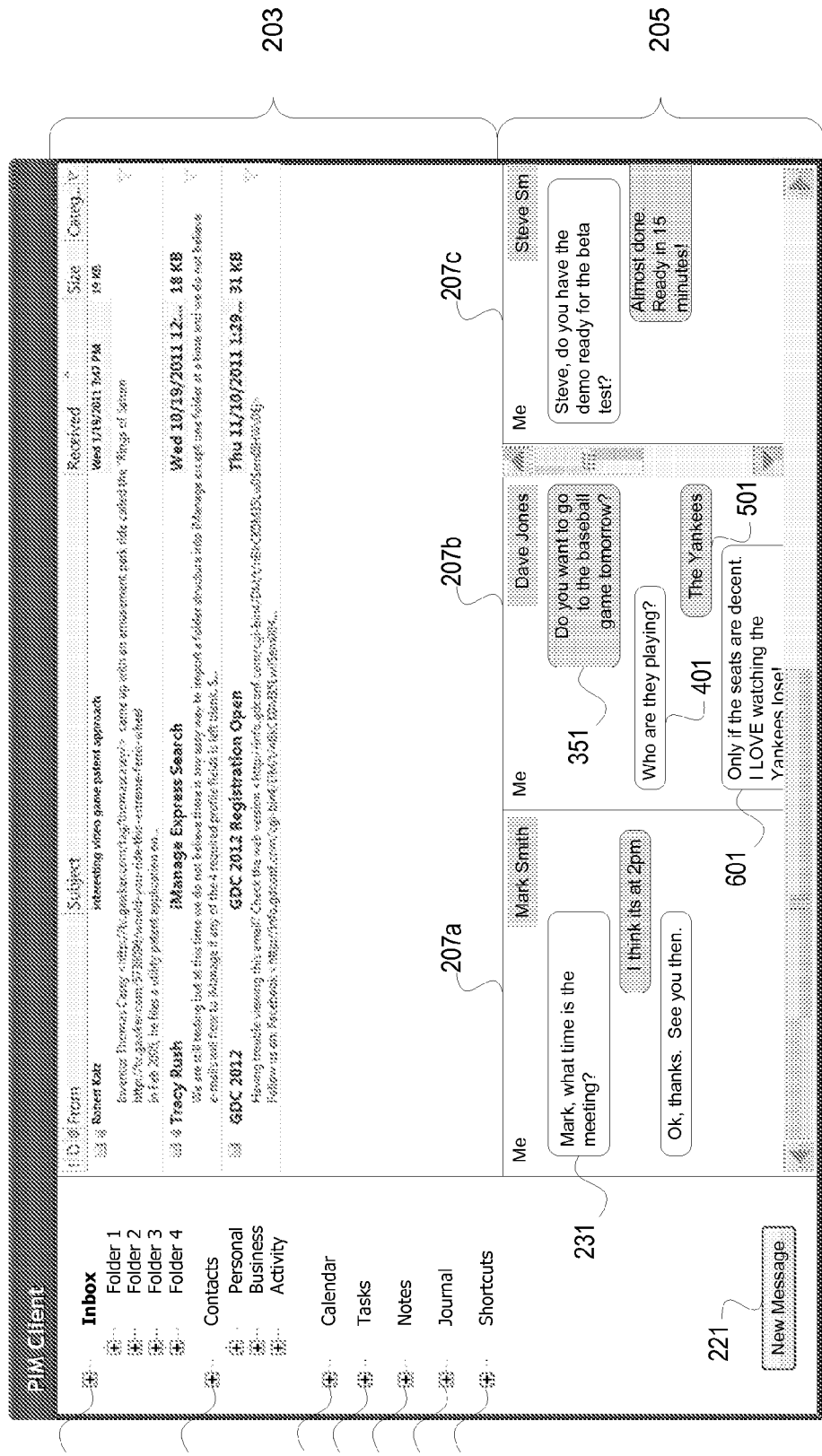
FIGS. 2A-2C illustrate a personal information management user interface comprising a cross-platform-messages (CPM) client that may be used according to one or more illustrative aspects described herein.

With reference to FIG. 2A, a personal information management (PIM) client 201 may be adapted to provide an integrated Instant Message (IM) feature 205 alongside existing services supporting email 203, contacts 209, calendar 211, Tasks 213, Notes 215, Journal 217, Shortcuts 219, etc. Integrated IM feature 205 alternatively may be included as a plug-in for existing PIM software (e.g., MICROSOFT's OUTLOOK, APPLE's MAIL, and IBM's LOTUS NOTES). Integrated IM feature 205 may also be included as a plug-in for use with various instant messaging services (e.g., AMERICA ONLINE's INSTANT MESSENGER; YAHOO!'s MESSENGER), also referred herein as third-party instant messaging services. The client or plug-in may integrate third-party instant messages using an application programming interface (API) made available by the producer of the third-party instant messaging service. An email client adapted with an instant messaging service according to aspects described herein is referred to as a cross-platform messaging (CPM) system. Various aspects will be described herein as being performed by a PIM client or CPM client. A PIM client that is capable of distinguishing between CPM messages and traditional e-mail messages may be referred to as a CPM-capable PIM client. In some embodiments, a CPM client may be used interchangeably with a CPM-capable PIM client. However, in some embodiments, a CPM client may be separate from, or used in conjunction with, a CPM-capable PIM client (see e.g., FIG. 2B). Additionally, while certain features may be discussed in terms of being executed by a CPM client, these features may, in some arrangements, be executed by a CPM-capable PIM client (or vice versa).

According to an aspect a unified inbox 208 may be used to access one or both of email 203 and/or instant messaging 205. Instant messaging content area 205 may be split into one or more IM threads 207a, 207b, 207c, . . . , 207n. In the present example three threads are shown, which a user may navigate between using the illustrated scroll bar. Each thread may indicate the parties to the conversation with corresponding messages in the thread, e.g., based on shading, text, or other visual cues. CPM-capable PIM client 201 may automatically sort the threads based on the name of the other party to the conversation, based on which thread has the most recently sent and/or received message, or based on other predefined criteria. CPM-capable PIM client may also include a new message control 221, as well as other controls for forward, reply, delete, etc. (not shown). Each thread 207 may comprise one or more individual messages 231. In embodiments where cross-platform messages are shown alongside third-party instant messaging services, a user may not be able to distinguish between a displayed cross-platform message thread and a thread of the third-party instant messaging service (e.g., thread 207c appears similar to a YAHOO! MESSENGER thread).

According to an aspect described herein, CPM-capable PIM client 201 (or an associated CPM-capable PIM server) may be adapted to analyze the subject line and/or contents of a message to determine whether the message is intended as an email message, an IM message, or a cross-platform message. In some embodiments, a cross platform message and an email message may use the same message format as previously used by CPM-capable PIM client 201 for traditional email messages. However, CPM-capable PIM client 201 may be adapted to treat and present a received message as a cross-platform message (CPM) when one of any predefined criteria occur. Such criteria may include any one or more of: 1) the message has content only in the subject, and the message body is empty or null; 2) the message body contains only predefined content, such as a user's prepopulated "signature" or other form text, and 3) the message includes a metadata tag inserted by another CPM client indicating the message should be treated as a CPM (referred to herein as a CPM tag). In essence, messages are treated differently based on whether there is any significant content in the body of the message, if the body of the message is left blank (or unedited), or if there is data embedded in the message allowing a CPM-capable PIM client to identify the message as a CPM.

For example, CPM-capable PIM client 201 may analyze a message and, when there is no content in the body of the message (e.g., the sender only typed text into the subject line), or the CPM tag is present, CPM-capable PIM client 201 may treat the message similar to instant messages as opposed to an email, and therefore display the CPM in IM content area 205 instead of email content area 203, as further described below. By treating these cross-platform messages in a manner similar to instant messages, users' inboxes remain less cluttered, and short messages between users can be presented in a threaded view.

Figure 2B:
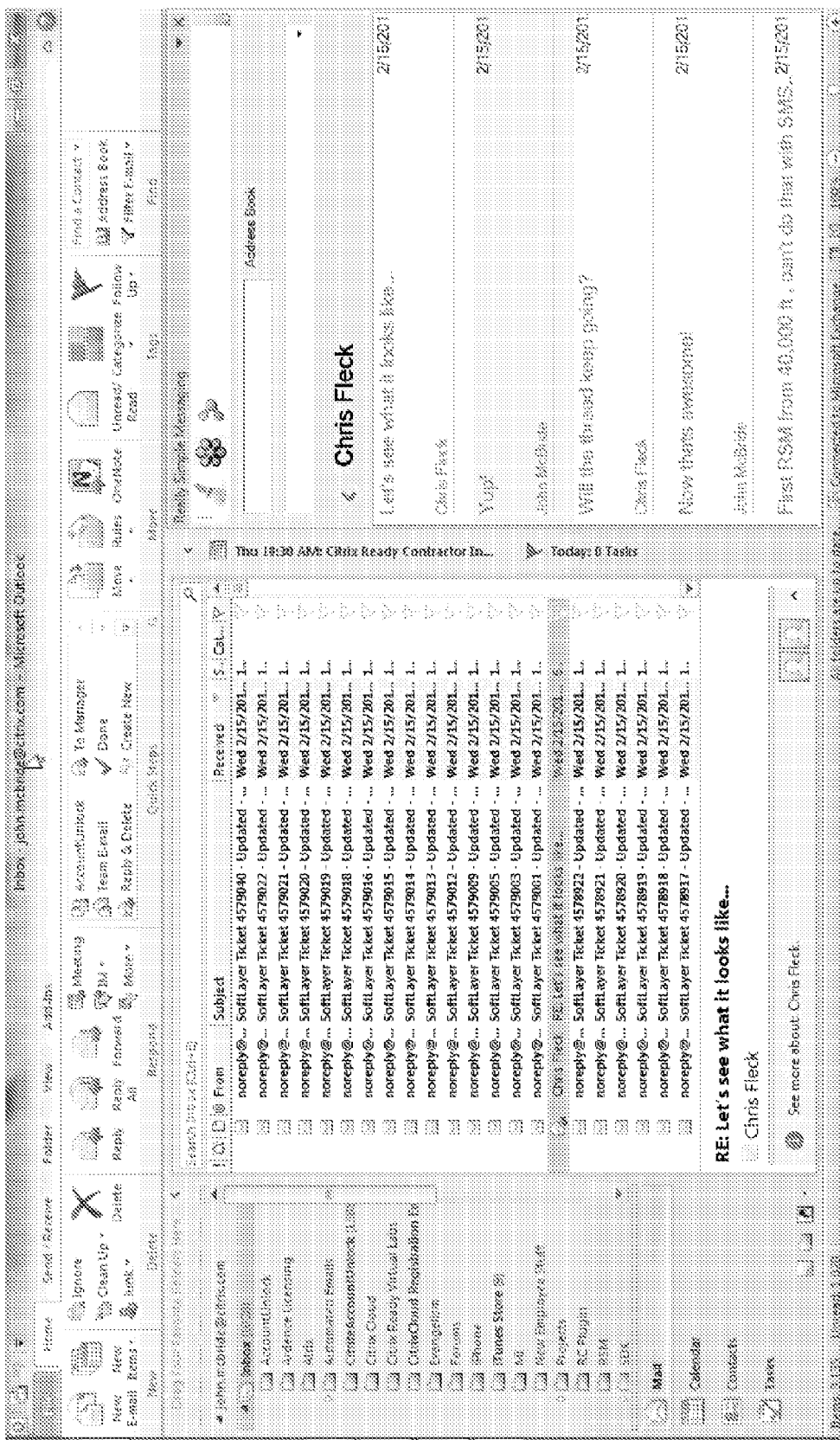

With reference to FIG. 2B, CPM-capable PIM client 201 may comprise a cross-platform-messages (CPM) client 250 embedded within the PIM client 201. CPM client 250 can execute within the context of a PIM client (e.g., CPM-capable PIM client 201) to handle messages identified as cross-platform-messages (and therefore enable the PIM client to be CPM-capable). In one instance, CPM client 250 can analyze and filter all email messages to display messages identified as cross-platform-messages within an instant message interface provided by CPM client 250. CPM client 250, in some embodiments, is a plugin executing as a part of the CPM-capable PIM client 201.

In other embodiments, CPM client 250 executes as a standalone application in communication with a PIM client and able to filter email messages received by the PIM client and/or instant messages received via a third-party instant messaging service. In arrangements where the CPM client may communicate with a third-party instant messaging service, a user may be able to reply and send a CPM and a third-party instant message using the same standalone application.

Figure 2C:
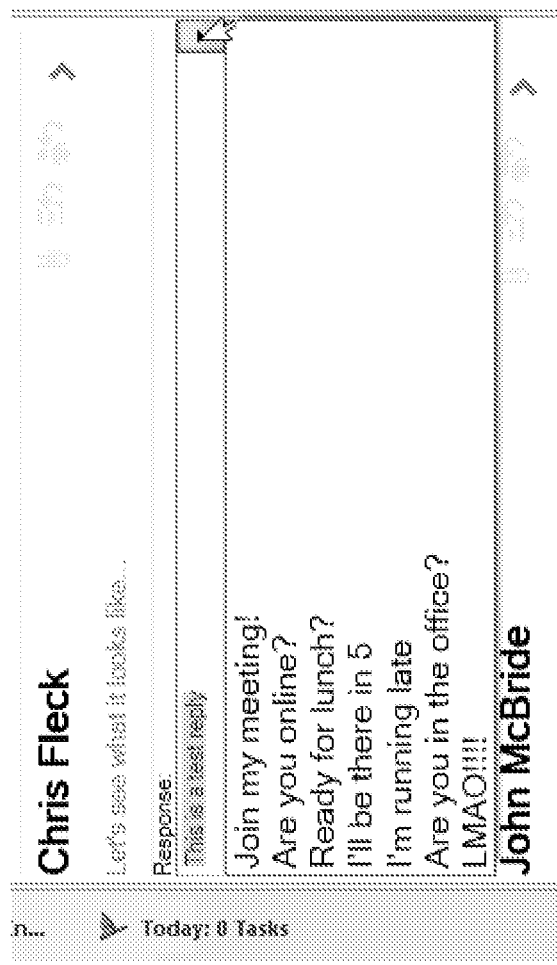

With reference to FIG. 2C, CPM client 250 can comprise predefined content such as common phrases and responses. These phrases can be hard coded into the CPM client 250 or can be configured by an administrator. In some instances, commonly used phrases can be identified as such and included in the group of predefined content. A user need only select a predefined phrase or response to respond to a message displayed within CPM client 250.

In yet another aspect described herein, CPM-capable PIM client 201 (or an associated PIM server) may analyze the content of the message to identify a unique identifier (CPM tag) to determine whether the message should be displayed as an email message or an IM message. The CPM tag can be embedded within the body of the email message, within the title of the email message, or as metadata associated with the email message. The CPM tag can comprise any combination of numbers and characters—in many instances unique identifiers are predetermined and incorporated into an email message by the CPM-capable PIM client 201 or by an application executing within the context of PIM client 201 (e.g. a plugin such as CPM client 250). Determining whether an email message is a cross-platform message can include searching for the existence of a particular unique identifier, or in some cases, analyzing a found unique identifier.

CPM-capable PIM client 201 may use the content of a found CPM tag to configure an instant message interface. For example, a CPM tag may include content directing either CPM-capable PIM client 201 or an application executing within the context of CPM-capable PIM client 201 to concatenate the message onto an existing conversation. CPM tag content may comprise instructions for formatting the look and feel of a conversation, such as the title of the conversation or the visual theme of a conversation. In other aspects, the CPM tag may direct CPM-capable PIM client 201 to display the instant message in an instant message interface embedded into CPM-capable PIM client 201, or may direct CPM-capable PIM client 201 to display the instant message in an instant message application executing separate from CPM-capable PIM client 201.

In some embodiments, the content of the message may include a history of messages passed between users. This history may have been embedded by a CPM-capable PIM client or CPM client. For example, CPM-capable PIM client 201 may insert HTML code that replicates the instant message interface embedded into CPM-capable PIM client 201 (e.g., include a history of messages transmitted to/from Mark Smith coded to look similar to thread window 207*a*). In such embodiments, a recipient of the cross-platform message (e.g., Mark Smith of thread window 207*a*) may not be executing a client capable of determining cross-platform messages (e.g., not execute a client similar to CPM client 250 or CPM-capable PIM client 201), but may still be able to process the cross-platform message as a normal e-mail message. In some arrangements, the subject of a cross-platform message may be included in the embedded history as the most recent message in the conversation between the users. If the recipient (e.g., Mark Smith of thread window 207*a*) responds with a new message, CPM-capable PIM client 201 may determine it is a cross platform message, and may update the history between the users according to the received message so that any embedded history may include the new message. The history of messages may be retrieved from a database of messages and threads. Additionally, the embedded history may be time based. For example, the embedded history may include only messages that were sent and received within a threshold time period.

Figure 11:
FIGS. 11 and 12 illustrate additional personal information management user interfaces that may be used according to one or more illustrative aspects described herein.
Figure 12:
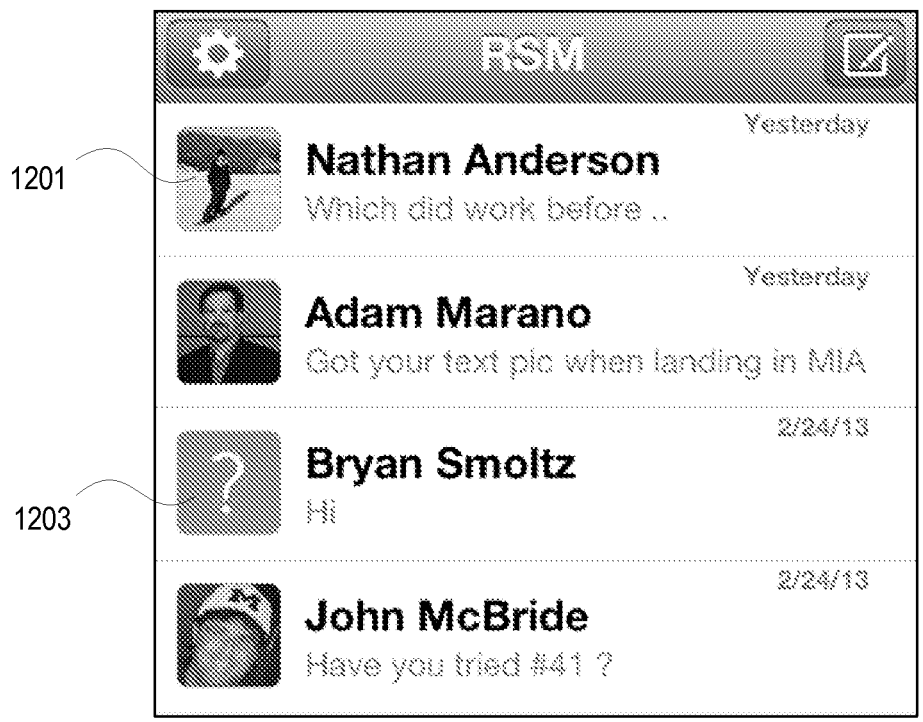

Additionally, an image may be included in the message (e.g., in the body of the message or as metadata) that is for use as a user identifier (also referred interchangeably as a user identifier image), such as an avatar, user icon, or the like. For example, a CPM-capable PIM client 201 may extract the user identifier image from the message and display it in the user-interface alongside every message, so as to identify the message's sender. FIGS. 11 and 12 provide examples of a user-interface that displays images along with a message's text. In some arrangements, the sender may be able to select what image is displayed alongside his or her cross-platform messages. In others, a recipient may be able to select (e.g., via a user profile) what image is displayed alongside cross-platform messages from a particular sender.

Figure 3:
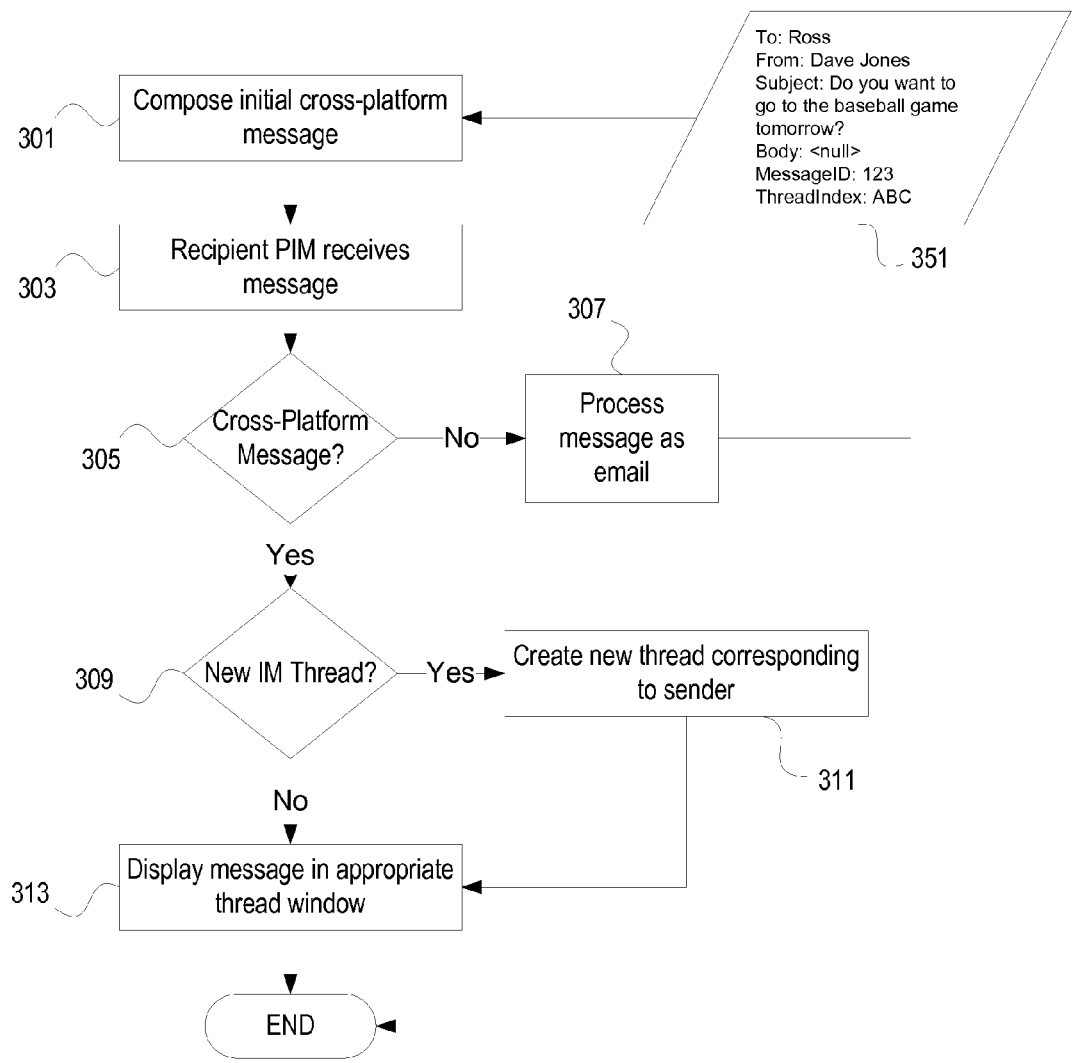
FIG. 3 illustrates a flowchart for handling cross-platform messages (CPM) according to one or more illustrative aspects described herein.

FIG. 3 shows an illustrative method for handling cross-platform messages. In step 301, a user composes an initial cross-platform message, such as message 351, using an email client, and sends the message to the identified recipient. In step 303, CPM-capable PIM client 201 associated with the recipient receives the message, and in step 305 CPM-capable PIM client 201 checks to see whether the message should be displayed in an instant messaging interface, such as whether message 351 is a cross-platform message. If the message is not determined to be a cross-platform message, then in step 307 CPM-capable PIM client 201 processes message 351 as an email message, as is known in the art. However, if CPM-capable PIM client 201 determines message 351 to be a cross-platform message, then CPM-capable PIM client proceed to step 309 to process message 351 as a cross-platform message.

In step 303, CPM-capable PIM client 201 may receive a message from any type of PIM client (e.g., CPM-capable or not). For example, a recipient may receive an email message generated by APPLE MAIL, and display that message in an instant message interface embedded within an instance of MICROSOFT OUTLOOK. That email recipient may then respond to the APPLE MAIL message via the instant message interface such that the email sender receives the instant message reply as an email message displayed within their instance of APPLE MAIL. Email recipients can also receive email messages from any type of platform. For example, an email recipient may receive an email message generated by a BLACKBERRY device, and display that message as an instant message within an instance message interface executing on email recipient's APPLE IPHONE. An email recipient may respond to the email message using the instant message interface such that email sender receives the instant message reply as an email message on email sender's BLACKBERRY. In some instances, CPM-capable PIM client 201 can receive messages from any type of PIM client regardless of whether that client executes a CPM client application or is otherwise CPM-capable.

In step 309 CPM-capable PIM client 201 determines whether message 351 corresponds to a current thread window. For example, CPM-capable PIM client 201 might determine whether message 351 corresponds to an existing thread based on a Message-ID of the received message, based on a Thread-Index field of the received message, based on a To field, based on a From field, based on a sender of the received message, or based on some other criteria that correlates messages as belonging to the same thread. If no thread window currently exists, then in step 311 CPM-capable PIM client 201 creates a new thread window for message 351. In step 313 CPM-capable PIM client 201 displays received message 351 in the appropriate thread window, e.g., window 207*b*. CPM-capable PIM client 201 may also shade message 351 in window 207*b* or display message 351 in a different color to indicate that the message was received from someone else, as opposed to being a message sent by the user of CPM-capable PIM client 201.

As described above, a CPM-capable PIM client may display incoming email-type messages in an email interface or an instant messaging interface based on whether the message is a CPM message. CPM messages, which may be for display in the instant messaging interface, the CPM-capable PIM client may display the CPM messages in a separate threaded view similar to SMS or IM chat. In some embodiments, CPM-capable PIM client 201 may display a notification that a new IM message was received. When the user clicks on the notification a threaded conversation view 205 may be presented with all thread windows 207a-207c with one or more contacts. Users or system admins may also be able to set whether new messages are displayed on top of a thread or at the bottom. Additionally, each message thread may include an unread count indicator (not shown).

The user experience of the displayed cross-platform messages may be familiar to any SMS/IM user, but may be integrated within an email client (or as a plug-in/side bar for MICROSOFT OUTLOOK or other Mail app). Aspects described herein may also be included within a mobile mail app, e.g., by displaying only the relevant thread window when a user clicks on a new message notification. The thread windows 207a-207c may also be displayed as separate application windows, or as its own application window separate from the PIM client's window for e-mail messages.

With reference to FIG. 4, FIG. 5, and FIG. 6, when the user of CPM-capable PIM client 201 desires to respond to message 351, the user may create a message 401 in response. When CPM-capable PIM client 201 sends message 401, CPM-capable PIM client 201 may also display message 401 in thread window 207b. The user with which PIM client 201 is communicating may similarly compose and respond with subject only message 501, which CPM-capable PIM client 201 may then display in thread window 207b. When the user of CPM-capable PIM client 201 desires to respond to message 501, the user may create a message 601 in response. When CPM-capable PIM client 201 sends message 601, CPM-capable PIM client 201 may also display message 601 in thread window 207b.

Various options and modifications may be made to enhance the user experience. For example, some email programs include standard signatures in the body of every message, regardless of whether the user actually types anything into the body of the message. In step 305, CPM-capable PIM client 201 (or a CPM-capable PIM server) may ignore signatures when determining whether the message is deemed a cross-platform message (a CPM message). In some aspects, a CPM-capable PIM client or a CPM client may analyze message content to determine whether a signature is present, e.g., by searching for common message closings such as "Best,", "Regards,", "Sincerely," and the like, and ignore any content after the identified message closing. The CPM-capable PIM client or the CPM client may also search for a closing by matching the senders name in the message body against the senders email or other ID from which the message was sent. For example, a CPM client may identify a closing signature by comparing a sender's email address (e.g., johndoe@acme.com) to the text "Sincerely, John" in the body of the message. Any heuristic may be used that is usable to identify text not specifically typed by a user into that message. A CPM client or CPM-capable PIM client may similarly maintain a database (e.g., database 129 or 131) of senders and repetitive content received in multiple messages from that sender. The presence of common repetitive text from a single sender may be used as an indication that that particular text is a signature (or some other form content), and thus may be ignored by the CPM client or CPM-capable PIM client when determining whether the message has any content in the message body.

CPM-capable PIM client 201 (or CPM-capable PIM server) may assign a new thread ID to a message to independently maintain a database (e.g., database 129 and/or 131) of messages and threads. In some arrangements, a user may be able to search the database to select a particular thread or message for display. Another optional aspect may include a security feature whereby CPM-capable PIM client 201 (or a CPM-capable PIM server) may filter or limit the domains and or contacts from which subject only messages are accepted, or from which subject only messages are displayed as IM messages rather than as traditional email messages. For example, an administrator at a particular company could limit cross-platform message processing for only those messages sent within a domain associated with that company, thereby excluding subject only message processing for someone within the company communicating with someone outside of the company. CPM-capable PIM client 201 may further include security features that allow for a user or admin to define what messages or threads are recorded in the database of messages and threads.

An additional security feature may include an ability to apply one or more secure messaging protocols to the cross-platform messages, such as encryption via public keys of Secure/Multipurpose Internet Mail Extensions (S/MIME), or other encryption scheme. Users or system admins may be able to select the security features that are applied by a CPM-capable PIM client to cross-platform messages.

A CPM-capable PIM client or CPM client may also communicate with other clients to determine whether another user of a thread window is currently present or not. The thread window may be modified to reflect whether the other user is present or not. For example, "Mark Smith" of thread window 207a may be shown in italics when not present and bold when present. One or more graphical indicators may also be used to indicate presence. Various processes may be used to determine presence. For example, presence may be determined by a PIM client or CPM client. For example, the PIM client for user "Mark Smith" may communicate to other clients that he is present if, for example, the PIM client has sent a message within a threshold time or had the PIM client application window in focus within a threshold time. Otherwise, PIM client for user "Mark Smith" may communicate to other clients that he is not present. Third party presence aware services may also be used, such as MICROSOFT LINK or CISCO JABBER.

As described herein, the unique handling of CPMs provides many benefits over existing alternatives. For example, CPM messages can be handled cross-platform. Any device that has an email client or messaging service plug-in configured for use with CPM messages may be used to communicate in the described manner. In addition, even if a device does not support CPM messages, that device would still be able to process a CPM message as a traditional email message, and thereby a user of that device could still communicate with the sender of the CPM message (just not with the threaded view or other special features of a CPM-capable PIM client or CPM client as described herein). In addition, CPM messages utilize existing email protocols. No new IM system is needed, no new central registration is required, and there are no issues with independent IM systems causing inconsistent usage within a company or organization.

The use of CPM messages may also unify IM and email. Instead of deciding when to use email and when to use IM, a user can have one application that handles both, and can decide which to use "on the fly" by deciding whether to enter any text into the body of a new message or not. A CPM-capable PIM client software handles each message automatically based on whether there is content in the body or not, or whether a CPM tag is present.

The CPM message handling techniques described herein can be used in place of cost-driven SMS/MMS messaging on wireless carriers' networks. That is, similar to Apple iMessage and RIM's BlackBerry Messaging, CPM messaging would not only provide free messaging, or messaging at only minimal cost based on data transmission, but would also work cross-platform on any compatible device, including PC/Mac. In addition, because CPM messaging is compatible with virtually any email client (or can be) so that CPM messages look and operate better than traditional emails, adoption is likely to quickly spread, e.g., viral adoption. According to one aspect, a brand name, protocol descriptor, or other moniker, for example, REALLY SIMPLE MESSAGING™, or RSM™, may be used, and branding such as "Sent by RSM™" may be applied to messages that use the technology described herein.

According to another alternative, CPM messages and traditional non-CPM email messages may incur different levels of notification on a device. For example, SMS is often used because it frequently defaults to a higher or more urgent notification on a device (such as a mobile device or smartphone) than does email. CPM-capable PIM client 201 or mobile device 109 may be programmed such that CPM messages similarly result in a higher or more urgent level of notification than regular email messages, or other notifications based on user settings. A user interface in which CPM messages are presented may further provide an extensible, unified view inclusive of other IM systems such as MS Communicator, AIM, etc., and may be color coded or shaded such as is illustrated in FIG. 2A.

Figure 7:
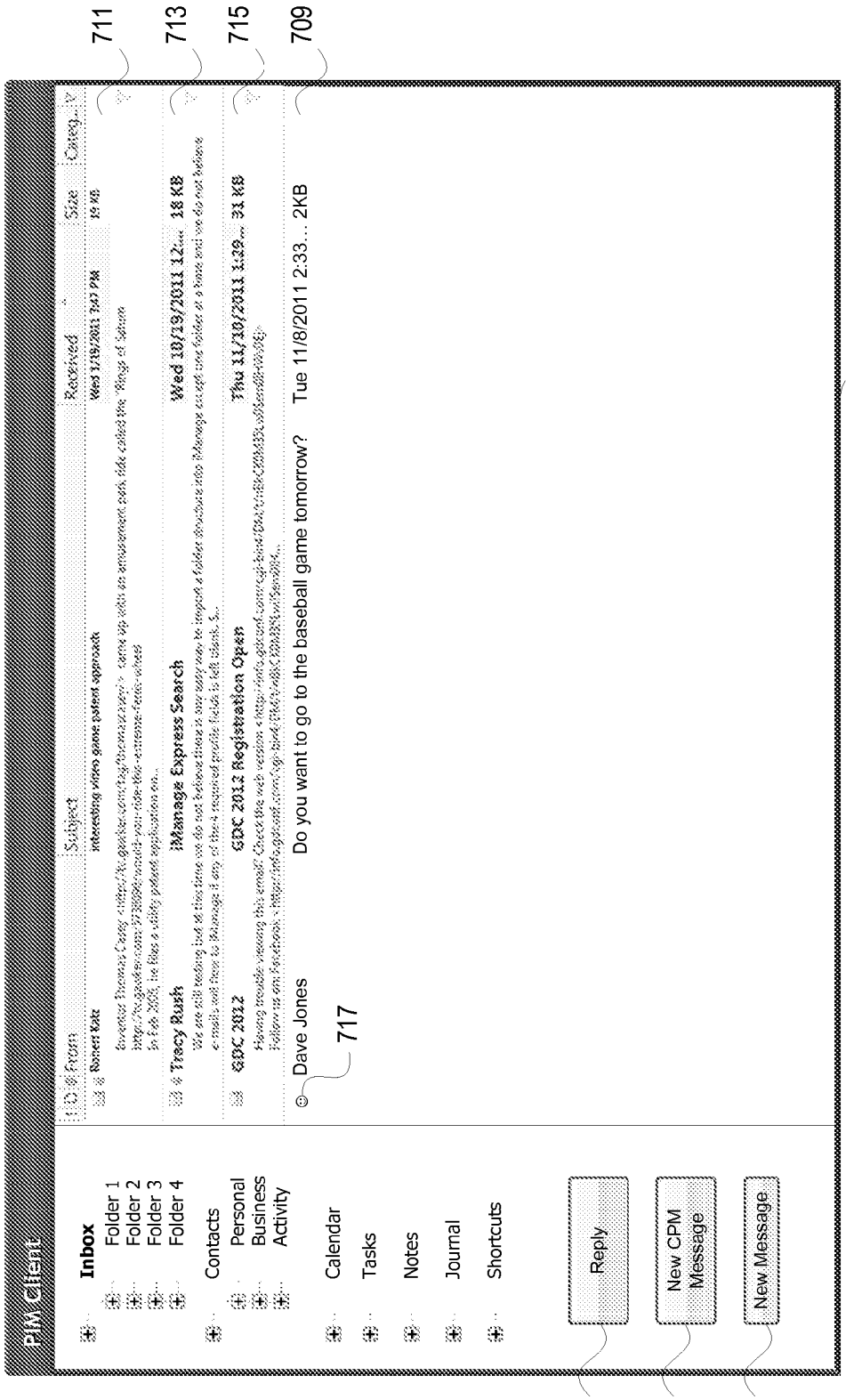
FIG. 7 illustrates another personal information management user interface that may be used according to one or more illustrative aspects described herein.

According to an alternative embodiment, with reference to FIG. 7, CPM message may be displayed with non-CPM messages. CPM-capable PIM Client interface 701 includes New Message button 703, new CPM message button 705, and reply button 707. Similar buttons may be included on CPM-capable PIM client 201 as well (not shown). CPM-capable PIM client 701 displays CPM thread 709 inline with other non-CPM messages 711, 713, 715. FIG. 7 illustrates thread 709 as displayed when message 351 (FIG. 3) is received from "Dave Jones". FIG. 8, FIG. 9, and FIG. 10 illustrate thread 709 after CPM-capable PIM client 701 sends message 401, receives message 501, and sends message 601, respectively. In the embodiment depicted in FIGS. 7-10, when a user replies to a CPM message, CPM-capable PIM client updates the thread inline instead of keeping the original subject title (Re: Old message). CPM-capable PIM client 701 recognizes the CPM message interaction and updates the inline thread accordingly.

Messages sent from the user associated with CPM-capable PIM client 701 may be prefaced with "ME:" or some other indicia indicating that the user sent the CPM message to the named other party, rather than receiving the message from the other named party (in this case, Dave Jones). The user of the CPM-capable PIM client would see the most recently received message or reply on the subject line of the CPM-capable PIM client and would not need to open the thread to read it. Optionally, if the user does select the PIM thread 709, CPM-capable PIM client may display the full CPM threaded exchange in a portion of interface 701 (e.g., as shown in FIG. 2A) or in a separate window (not shown). CPM messages may optionally be displayed with a special icon 717 to distinguish CPM threads from regular email messages.

According to an aspect, when a user selects reply button 707 regarding a reply to a CPM thread, e.g., with respect to thread 709, CPM-capable PIM client 701 may automatically organize and filter subject line messages between the PIM client user and the original sender, organize them in an easy to read formatted thread and insert that thread into the body of an email, and send the thread as a normal email to a non-CPM message user.

According to another alternative, CPM messaging capabilities as described herein may be implemented as a stand-alone software application that communicates over email protocols but communicates directly with the email server such as Microsoft Exchange or other known email servers. Regular emails with content may be ignored by the stand-alone application and handled instead by a local email client. The standalone application may identify CPM messages and present them in a threaded view as shown above, or similar to other SMS/IM presentations.

In some aspects CPM messaging and/or CPM messaging clients may integrate with existing techniques for presence awareness. Contacts that are online (based on email activity or other indicators) or available based on open calendars may be presented with a special indicator or icon and CPM message launch button or input control.

Subject lines of emails may contain URLs. CPM messaging may treat URLs similar to any other CPM message or that the URL may be clickable by a user to access the linked-to resource directly. However, subject lines cannot include attachments such as photos, videos, documents, and the like. CPM messages, however, may provide this functionality by allowing users to attach content to CPM messages much the same way digital content can be attached to SMS/IM messages, but using existing email attachment capabilities of the CPM client. For example, end users may attach photos, videos, documents, messages, or any other type of digital content to a CPM message, just as could be attached to an email, such that a displayed CPM message can include an identifier indicating that the CPM message includes attached digital content. This identifier may include a thumbnail view of the attached content, or may be a clickable predetermined identifier that provides access to the digital content when clicked. Attached digital content can therefore be attached to CPM messages much the same way that digital content can be attached to typical email messages.

CPM-capable PIM client 201, 701 may also include a feature to prepopulate frequently used messages from a drop down menu with selectable messages such as "call me when you are available", "are you joining the meeting?", "Open for Lunch?", etc. These common CPM messages could be provided by default and/or user definable.

FIGS. 11 and 12 illustrate additional personal information management user interfaces. In particular, FIGS. 11 and 12 illustrate interfaces that display cross-platform messages and user identifier images. As illustrated in FIG. 11, user identifier image 1101 is displayed alongside cross-platform messages of a first user (e.g., messages received at a CPM client from a different party). User identifier image 1103 is a default image that can be displayed when a user has not yet assigned a user identifier image. Further, user identifier image 1103 is illustrated as being alongside messages sent by a second user (e.g., messages sent from the CPM client).

As illustrated in FIG. 12, the user interface shows messages received at a user device from different parties with each party having its own user identifier image or default user identifier image. For example, user identifier image 1201 is shown for a message received from Nathan Anderson, and default user identifier image 1203 is shown for a message received from Bryan Smoltz.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method, comprising:
receiving a plurality of email messages at a messaging application having a graphical user interface, wherein the graphical user interface of the messaging application comprises an instant messaging interface in a first display region displaying only instant messages and an email messaging interface in a second display region displaying only email messages, and wherein the first display region is discrete from the second display region; and
processing, by the messaging application, each of the plurality of email messages as either an email message or as an instance message by:
determining whether to process the email message as only an email message or only as an instant message,
displaying, by the messaging application, the email message in the email messaging interface if it is determined that the email message should be processed only as an email message, and
displaying, by the messaging application, text included in the email message within the instant message interface if it is determined that the email message should be processed only as an instant message,
wherein at least one of the plurality of email messages is processed by the messaging application as an email message, and at least one of the plurality of email messages is processed by the messaging application as an instant message, and wherein when a particular email message is processed as an instant message that particular email message is not also processed as an email message.

2. The method of claim 1, wherein determining whether to process the email message as either an email message or as an instant message comprises determining that the email message is a subject-only message, and the text includes a subject field of the email message.

3. The method of claim 1, wherein determining whether to process the email message as either an email message or as an instant message comprises determining that the email message includes only predefined content.

4. The method of claim 1, wherein determining whether to process the email message as either an email message or as an instant message comprises determining that the email message includes a metadata tag.

5. The method of claim 1, wherein the instant messaging interface further comprises a plurality of display regions, each display region including messages exchanged with a single sender.

6. The method of claim 1, wherein determining whether to process the email message as either an email message or as an instant message is performed by an e-mail client.

7. The method of claim 1, wherein the email message is a cross-platform message (CPM).

8. The method of claim 7, wherein the email message includes a history of one or more CPMs sent between two or more users.

9. The method of claim 8, wherein the email message was received at a CPM-capable client and sent from a non-CPM-capable client.

10. The method of claim 1, further comprising:
indicating whether a sender of the email message is present.

11. An apparatus, comprising:
one or more processors; and
memory storing executable instructions configured to, when executed, cause the apparatus to:
receive a plurality of email messages by a messaging application having a graphical user interface, wherein the graphical user interface of the messaging application comprises an instant messaging interface in a first display region displaying only instant messages and an email messaging interface in a second display region displaying only email messages; and
processing, by the messaging application, each of the plurality of email messages as either an email message or as an instance message by:
determining whether to process the email message as only an email message or only as an instant message,
displaying, by the messaging application, the email message in the email messaging interface if it is determined that the email message should be processed only as an email message, and
display, by the messaging application, text included in the email message within the instant message interface if it is determined that the email message should be processed only as an instant message,
wherein at least one of the plurality of email messages is processed by the messaging application as an email message, and at least one of the plurality of email messages is processed by the messaging application as an instant message, and wherein when a particular email message is processed as an instant message that particular email message is not also processed as an email message.

12. The apparatus of claim 11, wherein determining whether to process the email message as an email message or as an instant message comprises determining that the email message is a subject-only message, and the text includes a subject field of the email message.

13. The apparatus of claim 11, wherein determining whether to process the email message as an email message or as an instant message comprises determining that the email message includes only predefined content.

14. The apparatus of claim 11, wherein determining whether to process the email message as an email message or as an instant message comprises determining that the email message includes a metadata tag.

15. The apparatus of claim 11, wherein the email message is a cross-platform message (CPM).

16. One or more non-transitory computer readable media storing executable instructions configured to, when executed, cause an apparatus to:
receive a plurality of email messages by a messaging application having a graphical user interface, wherein the graphical user interface of the messaging application comprises the instant messaging interface in a first display region displaying only instant messages and an email messaging interface in a second display region displaying only email messages; and
process, by the messaging application, each of the plurality of email messages as either an email message or as an instance message by:
determining whether to process the email message as only an email message or only as an instant message,
displaying, by the messaging application, the email message in the email messaging interface if it is determined that the email message should be processed only as an email message, and displaying, by the messaging application, text included in the email message within the instant message interface if it is determined that the email message should be processed only as an instant message, wherein at least one of the plurality of email messages is processed by the messaging application as an email message, and at least one of the plurality of email messages is processed by the messaging application as an instant message, and wherein when a particular email message is processed as an instant message that particular email message is not also processed as an email message.

17. The one or more computer readable media of claim 16, wherein determining whether to process the email message as an email message or as an instant message comprises determining that the email message is a subject-only message, and the text includes a subject field of the email message.

18. The one or more computer readable media of claim 16, wherein determining whether to process the email message as an email message or as an instant message comprises determining that the email message includes only predefined content.

19. The one or more computer readable media of claim 16, wherein determining whether to process the email message as an email message or as an instant message comprises determining that the email message includes a metadata tag.

20. The one or more computer readable media of claim 16, wherein the email message is a cross-platform message (CPM).

* * * * *